United States Patent
Yasuhara et al.

(10) Patent No.: US 7,490,934 B2
(45) Date of Patent: Feb. 17, 2009

(54) EYEWEAR END PIECE

(75) Inventors: Kazuto Yasuhara, Osaka (JP); Katsuya Takeshi, Osaka (JP)

(73) Assignee: Yamamoto Kogaku Co., Ltd., Osaka (JP)

( * ) Notice: Subject to any disclaimer, the term of this patent is extended or adjusted under 35 U.S.C. 154(b) by 0 days.

(21) Appl. No.: 11/317,275

(22) Filed: Dec. 23, 2005

(65) Prior Publication Data
US 2007/0153229 A1    Jul. 5, 2007

(30) Foreign Application Priority Data
Dec. 27, 2004    (JP) .............................. 2004-377164

(51) Int. Cl.
*G02C 5/14* (2006.01)
(52) U.S. Cl. ...................... 351/122; 351/117
(58) Field of Classification Search ................ 351/111, 351/114, 117–119, 122, 123
See application file for complete search history.

(56) References Cited

U.S. PATENT DOCUMENTS 1,482,739 A * 2/1924 Du Paul ...................... 351/117
2,083,287 A * 6/1937 Birkenstein ................. 351/118
7,055,952 B2 * 6/2006 Fecteau et al. .............. 351/122

FOREIGN PATENT DOCUMENTS

JP    3007012    11/1994

* cited by examiner

*Primary Examiner*—Darryl J Collins
(74) *Attorney, Agent, or Firm*—William L. Androlia; H. Henry Koda

(57) ABSTRACT

An object of the present invention is to provide an eyewear end piece which does not rotate around an axial core of a temple, which does not come off the temple, and which feels comfortable to wear. For this purpose, the eyewear end piece includes a first hard member, a second hard member and a flexible member in which the first hard member is formed in one end of the flexible member, and the second hard member is formed in the other end of the flexible member, respectively in an integral manner. The eyewear end piece may further include an insertion hole for a temple which extends through the first hard member and the flexible member to the second hard member.

10 Claims, 10 Drawing Sheets

EYEWEAR END PIECE

BACKGROUND OF THE INVENTION

1. Field of the Invention

The present invention relates to an eyewear end piece provided for a leading end portion side of a temple of an eyeglass frame.

2. Description of the Related Art

Conventionally, as this kind of eyewear end piece, there generally exists a structure formed by a hard synthetic resin.

Such an eyewear end piece attached to a leading end portion side of the temple of the eyeglass frame has an advantage that a stable attachment state can be maintained without rotating around an axial core of the temple and coming off the temple.

Further, as another example of a conventional eyewear end piece, there exists a structure formed by a flexible synthetic resin, for example, a structure in which an entire of an end piece 11 is formed by a flexible vinyl chloride or a flexible ionomer resin, as shown in FIG. 10 (Japanese Utility Model No. 3007012).

In this document, it is stated that the flexible end piece feels soft to a temporal region or an ear root portion of a user, and fitting comfortableness of the eyeglass can be improved. Further, it is stated that the end piece formed by the synthetic resin does not absorb moisture content such as sweat, as is frequent with a conventional structure made of a silicon resin, and therefore it is possible to solve a drawback that the eyeglass tends to slip down due to the absorption of sweat.

However, the conventional eyewear end piece formed by the hard synthetic resin has a problem that it feels hard to the temporal region and the ear root portion of the user, and the eyeglass with the conventional end piece feels uncomfortable to wear. Further, the conventional end piece has a problem that a surface of the end piece is slippery, and therefore the eyeglass tends to slip down easily from the ears of the user.

The conventional eyewear end piece only formed by the flexible material, as shown FIG. 10, has also a problem that it tends to rotate around the axial core of the temple due to its flexibility when it is inserted to the leading end portion side of the temple of the eyeglass frame, and therefore the eyeglass with the conventional end piece feels uncomfortable to wear. Even worse than feeling uncomfortable, the end piece comes off the temple in some cases.

SUMMARY OF THE INVENTION

Thus, the invention aims to solve the conventional problems mentioned above, and an object of the present invention is to provide an eyewear end piece which does not rotate around an axial core of a temple, which does not come off the temple, and which feels comfortable to wear.

For this purpose, the eyewear end piece of the present invention includes a flexible member 1, a first hard member 2a and a second hard member 2b in which the first hard member 2a is formed in one end of the flexible member 1, and the second hard member 2b is formed in the other end of the flexible member 1, respectively in an integral manner.

The eyewear end piece in accordance with this invention may further include an insertion hole 3 for a temple T which extends through the first hard member 2a and the flexible member 1 to the second hard member 2b.

Furthermore, the eyewear end piece in accordance with this invention may be structured such that a length of the flexible member 1 is made longer than a total length of the first hard member 2a and the second hard member 2b.

Moreover, the eyewear end piece in accordance with this invention may be structured such that a surface of the flexible member 1 has high coefficient of friction.

In addition, the eyewear end piece in accordance with this invention may be structured such that a hardness of the flexible member 1 is equal to or less than 90 degree of JIS type A durometer hardness, and a hardness of the hard members 2a and 2b is equal to or more than 50 degree of JIS type D durometer hardness.

Still more, the eyewear end piece in accordance with this invention may be structured such that the flexible member 1 is made of an elastomer resin.

Further, the eyewear end piece in accordance with this invention may be structured such that a come-off preventing means 3a is provided in an inner surface of the insertion hole 3, or a come-off preventing means Ta is provided in an outer surface of the temple T.

Furthermore, the eyewear end piece in accordance with this invention may be structured such that each of a vertical cross sectional shape of the insertion hole 3 at arbitrary positions in a front half and a rear half of the flexible member 1, a vertical cross sectional shape of the insertion hole 3 at an arbitrary position of the first hard member 2a, and a vertical cross sectional shape of the insertion hole 3 at an arbitrary position of the second hard member 2b are respectively formed in a rectangular shape, and a vertical cross sectional shape of the temple T at the corresponding positions is formed in a rectangular shape which coincides with the cross sectional shape of the insertion hole 3.

Since the eyewear end piece in accordance with the invention is structured as mentioned above, the end piece does not rotate around the axial core of the temple, the end piece does not come off the temple, and the eyewear with the end piece is comfortable to wear.

DESCRIPTION OF THE PREFERRED EMBODIMENTS

A description will be in detail given below of a best mode for carrying out an eyewear end piece in accordance with the invention with reference to the accompanying drawings.

Figure 1:
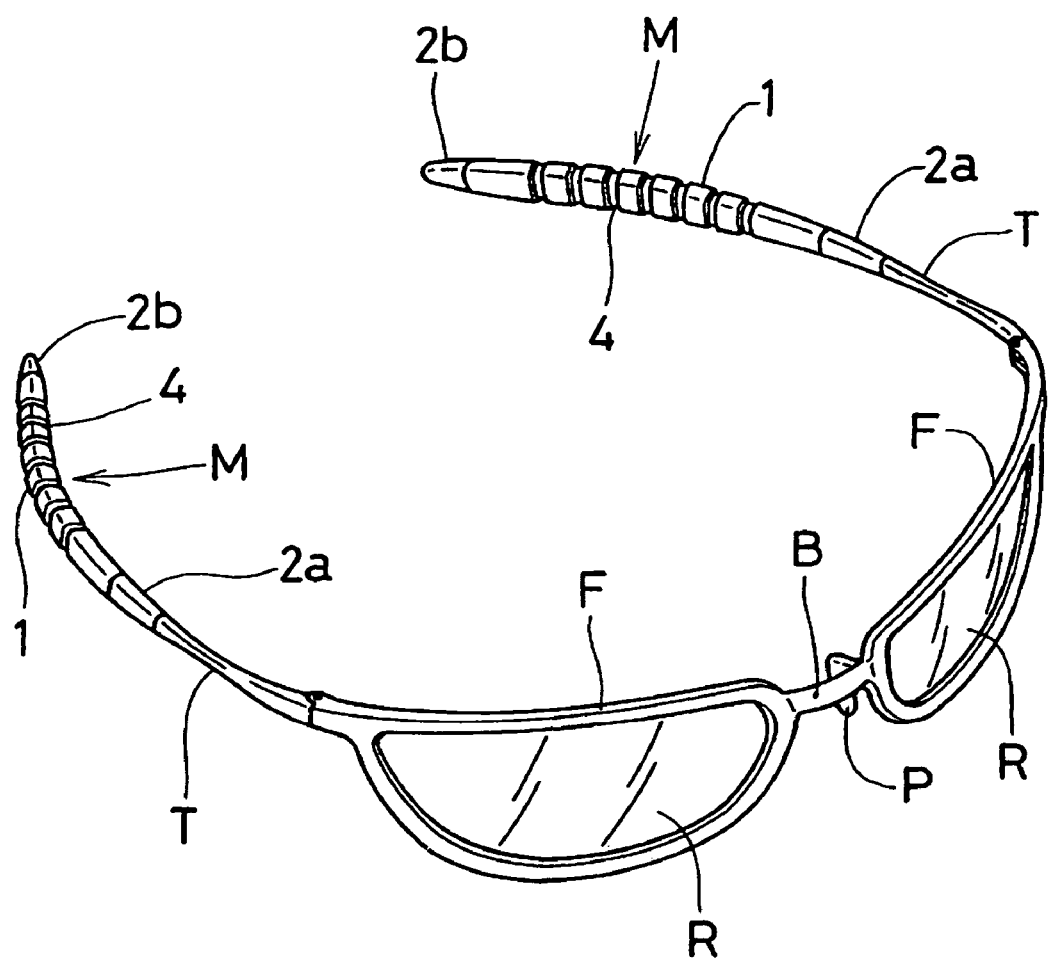
FIG. 1 is a perspective view showing an eyeglass to which an end piece of the present invention is attached.

FIG. 1 shows an eyeglass to which an end piece in accordance with the invention is installed. The eyeglass includes right and left lenses R and R, a bridge B coupling nose side upper end portions of the lenses R and R, pads P and P respectively mounted to nose side center portions of the lenses R and R, and temples T and T respectively mounted to the temple side upper end portions of the lenses R and R. Further, end pieces M and M of the present invention are respectively attached to a leading end portion side of the temples T and T. In FIG. 1, the eyeglass is structured such that frames F and F are provided in the right and left lenses R and R, however, the eyeglass may be structured as a frameless eyeglass having no frames F and F.

The end piece M includes a flexible member 1, a first hard member 2a and a second hard member 2b. The end piece is molded so as to be attached to a leading end portion side of the temple T during its molding process in which the first hard member 2a is integrally formed in one end of the flexible member 1, and the second hard member 2b is integrally formed in the other end of the flexible member 1, respectively.

The end piece M may further include an insertion hole 3 for the temple T which extends through the first hard member 2a and the flexible member 1 to the second hard member 2b. In this case, the end piece M is inserted to the leading end portion side of the temple T after the molding of the end piece is completed.

Figure 4:
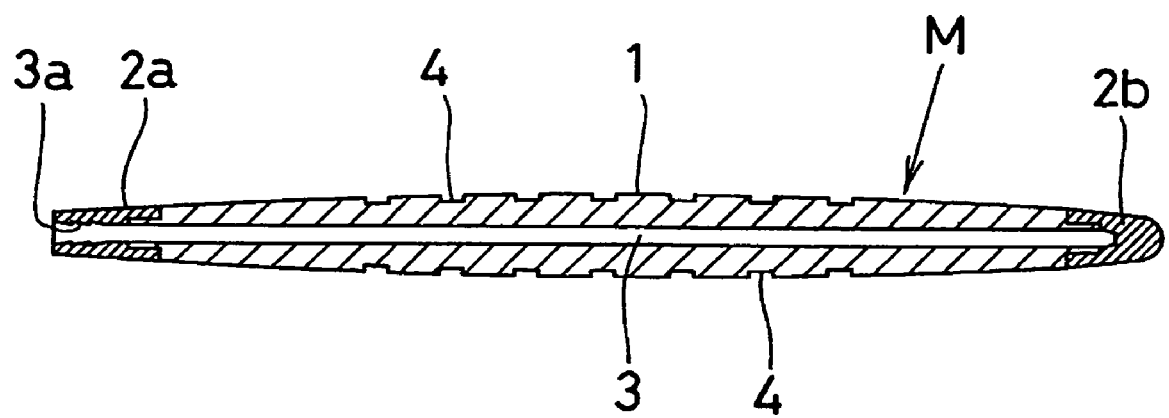
FIG. 4 is a cross sectional view in a longitudinal direction showing an embodiment of the end piece of the present invention.
Figure 5:
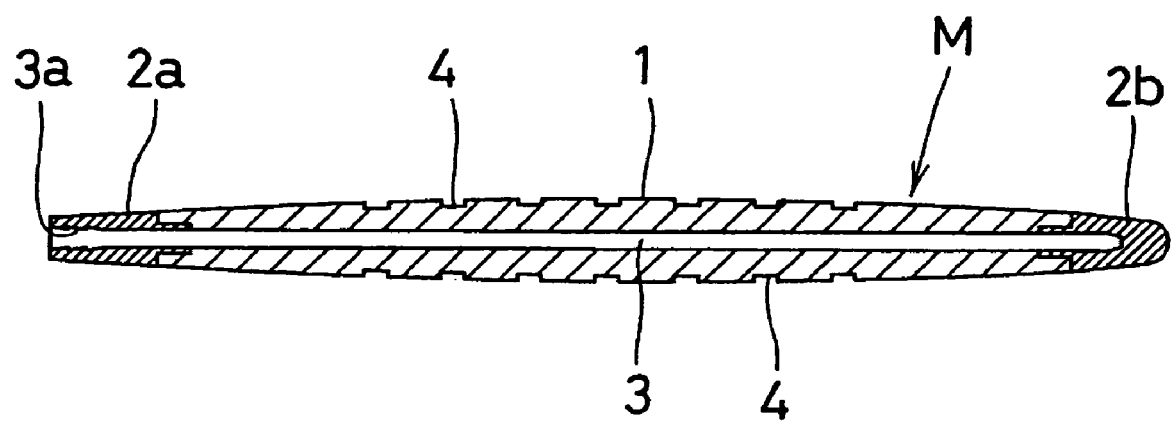
FIG. 5 is a cross sectional view in a longitudinal direction showing the other embodiment of the end piece of the present invention.
Figure 6:
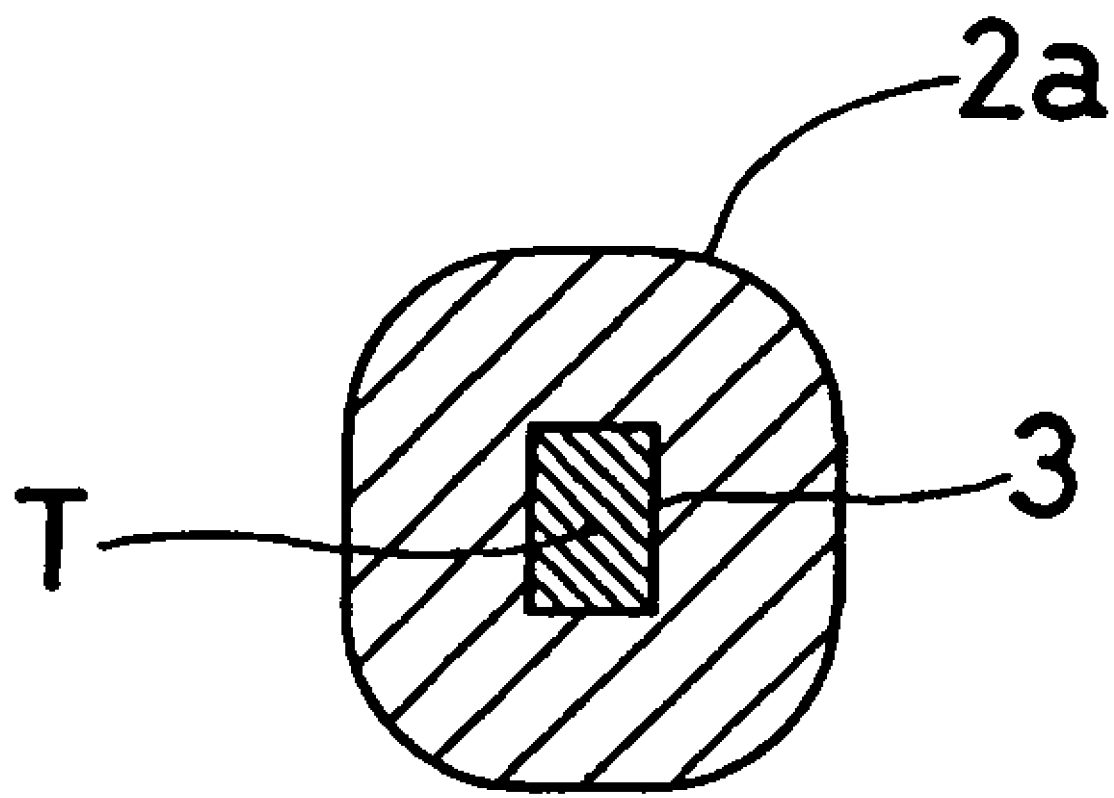
FIG. 6 is a cross sectional view along a line A-A in FIG. 2.
Figure 7:
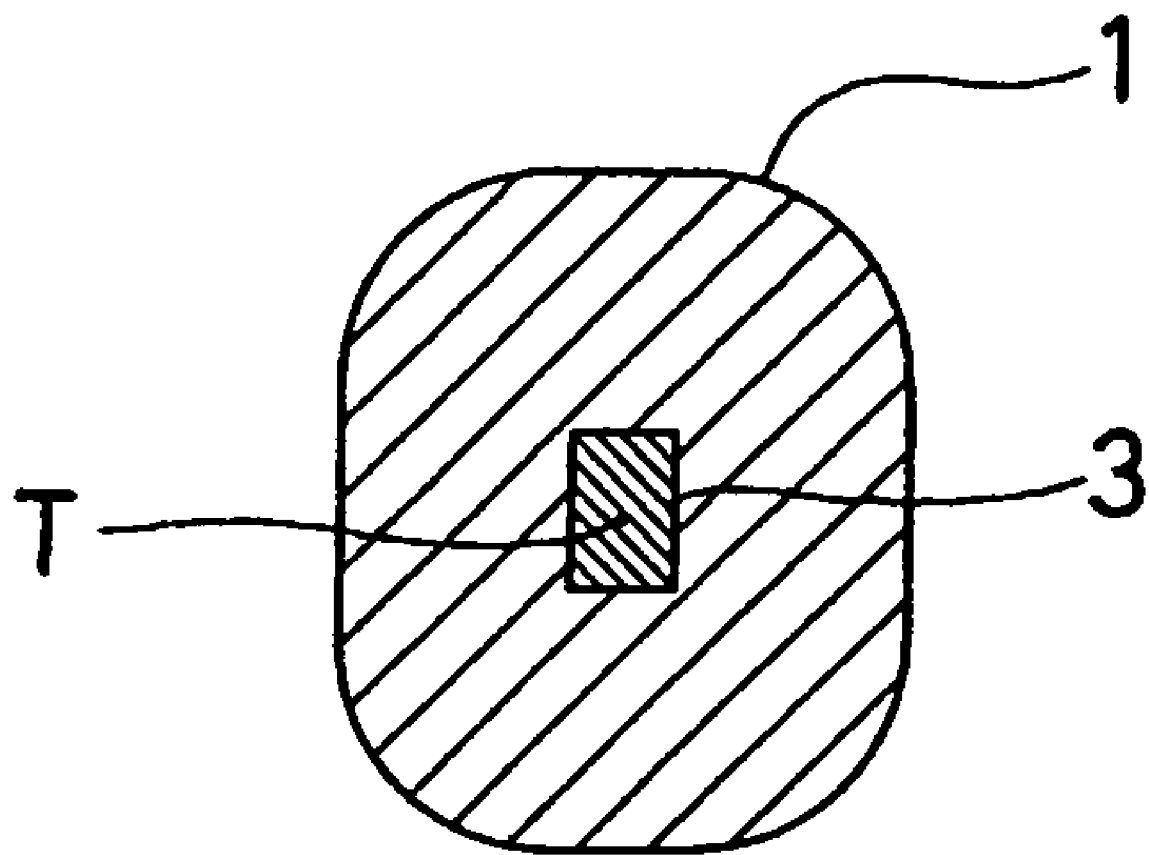
FIG. 7 is a cross sectional view along a line B-B in FIG. 2.
Figure 8:
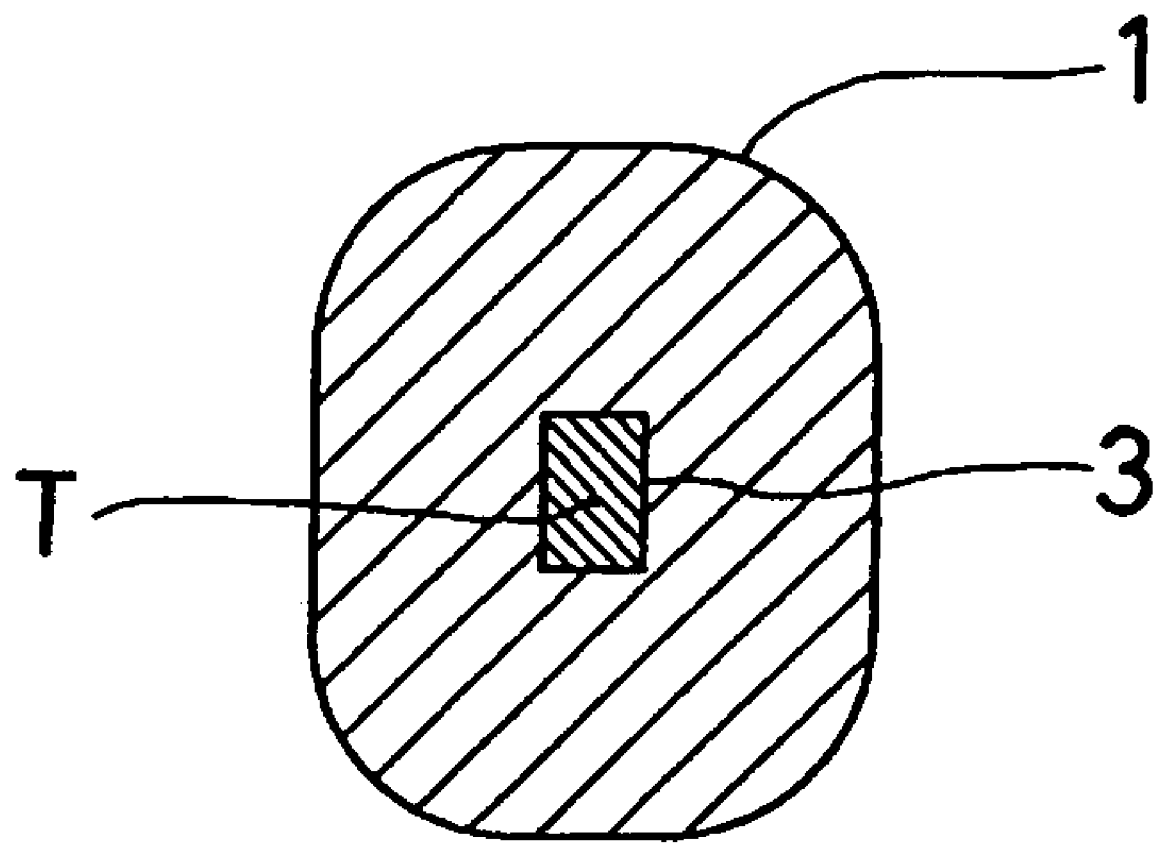
FIG. 8 is a cross sectional view along a line C-C in FIG. 2.
Figure 9:
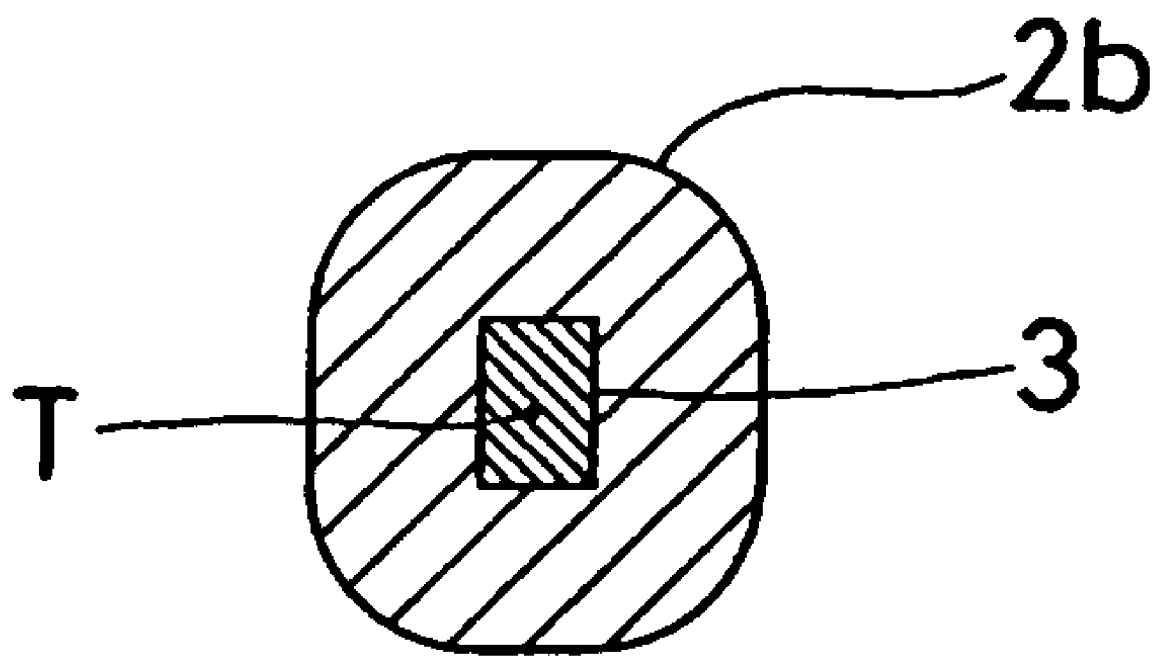
FIG. 9 is a cross sectional view along a line D-D in FIG. 2.
Figure 10:
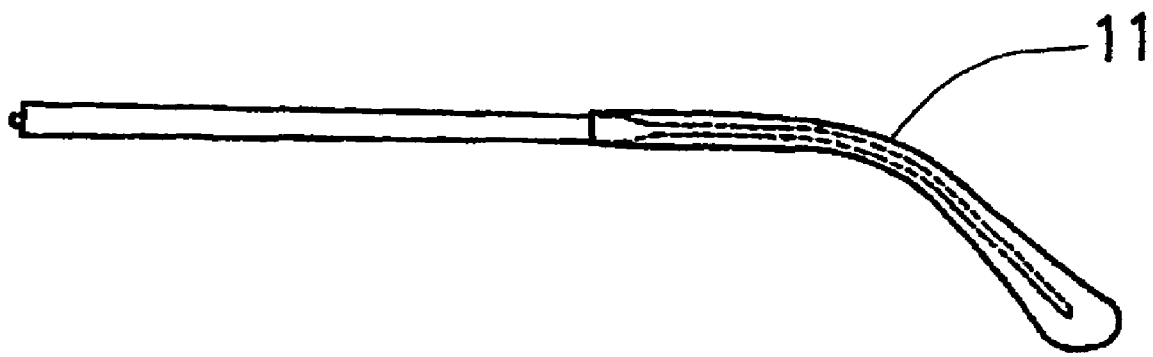
FIG. 10 is a side elevational view of a temple of an eyeglass in which a conventional end piece is attached.

In order to integrally form the flexible member 1 and the hard members 2a and 2b, for example, it is possible to fix the hard members 2a and 2b to both ends of the flexible member 1 respectively in accordance with an insert molding. In this case, the structure may be made such that the both ends of the flexible member 1 are respectively inserted into end portions of the hard members 2a and 2b, as shown in FIG. 4, or the end portions of the hard members 2a and 2b are respectively inserted into the both ends of the flexible member 1, as shown in FIG. 5. In accordance with this structure, a contact area between the flexible member 1 and the hard members 2a and 2b can be increased, and an adhesion degree can be improved. In this case, a rear end portion of the second hard member 2b may be molded to be closed during the molding process, or may be closed by a filling material afterward.

Further, the end piece M is structured such that a length of the flexible member 1 is made longer than a total length of the first hard member 2a and the second hard member 2b. In other words, it is preferable to make the lengths of the first hard member 2a and the second hard member 2b approximately equal to each other, and set a length of the flexible member 1 to about three times of the total length of the first hard member 2a and the second hard member 2b. In the illustrated structure, the length of the flexible member 1 is set to about 70 to 75 mm, the length of the first hard member 2a is set to about 12 to 14 mm, and the length of the second hard member 2b is set to about 9 to 11 mm. In accordance with the structure mentioned above, since the flexible member 1 is brought into contact with a temporal region and an ear root portion of a user, the eyewear with this end piece feels comfortable to wear.

Further, the end piece M is structured such that the flexible member 1 is made of an elastomer resin. As particular examples of resin to be employed, there can be listed up a polystyrene elastomer, a polyurethane elastomer, a polyolefin elastomer and the like. In addition to the elastomer resins, a rubber material can be employed to the flexible member 1. Further, the hard members 2a and 2b are structured so as to be made of various kinds of hard synthetic resins. As particular examples of hard resin to be employed, there can be listed up a polyolefin resin, a polyester resin, a polyamide resin and the like. A combination of the flexible member 1 which is made of the polystyrene elastomer and the hard members 2a and 2b which are made of the polypropylene resin is preferable because this combination can improve adhesiveness.

Further, the eyewear end piece M in accordance with this invention is structured such that a hardness of the flexible member 1 is equal to or less than 90 degree of JIS type A durometer hardness (hereinafter, refer to as duro A), and a hardness of the hard members 2a and 2b is equal to or more than 50 degree of JIS type D durometer hardness (hereinafter, refer to as duro D). If the hardness of the flexible member 1 is set to more than the duro A 90 degree, it does not have enough flexibility to feel comfortable. In order to obtain the most excellent wearing feeling, it is preferable to set the hardness of the flexibility 1 to the duro A 30 to 70 degree. If the hardness of the hard members 2a and 2b is set to less than the duro D 50 degree, there is a possibility that the hard members 2a and 2b rotate around the axial core of the temple T due to the low hardness.

Figure 3:
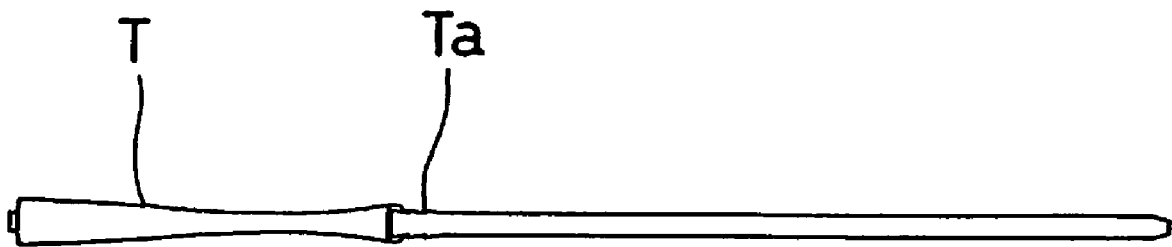
FIG. 3 is a side elevational view of the temple of the eyeglass in which the end piece of the present invention is not attached.

Further, the eyewear end piece M in accordance with the invention can be structured such that a come-off preventing means 3a is provided in an inner surface of the insertion hole 3, or a come-off preventing means Ta is provided in an outer surface of the temple T. The come-off preventing means 3a and the come-off preventing means Ta improve adhesiveness and enlarge a friction force between the end piece M and the temple T, thereby preventing the end piece M from coming off the temple T improperly. The come-off preventing means 3a can be constituted, as shown in FIG. 4 and FIG. 5, by a saw tooth shaped notch or the like formed in an inner surface of the insertion hole 3 where the first hard member 2a is positioned. The come-off preventing means Ta may be constituted by coating an outer surface of the temple T with a synthetic resin having a great friction force, or providing a saw tooth shaped notch in an outer surface of the temple T, as illustrated in FIG. 3. The come-off preventing means may be provided in one of the insertion hole 3 and the temple T, or in both thereof In the illustrated structure, the saw tooth shaped notch of the come-off preventing means 3a provided in the insertion hole 3 is engaged with the saw tooth shaped notch of the come-off preventing means Ta provided in the temple T, so that the end piece M and the temple T are connected more firmly.

Further, the eyewear end piece in accordance with this invention is structured such that each of a vertical cross sectional shape of the insertion hole 3 at arbitrary positions in a front half and a rear half of the flexible member 1, a vertical cross sectional shape of the insertion hole 3 at an arbitrary position of the first hard member 2a, and a vertical cross sectional shape of the insertion hole 3 at an arbitrary position of the second hard member 2b are respectively formed in a rectangular shape such as a triangle or a square, and a vertical cross sectional shape of the temple T at the corresponding positions is formed in a rectangular shape such as a triangle or a square which coincides with the cross sectional shape of the insertion hole 3. For example, as shown in FIGS. 6 to 9, vertical cross sectional shapes of the insertion hole 3 and the temple T are respectively formed in the square shape in a cross section along a line A-A, a cross section along a line B-B, a cross section along a line C-C and a cross section along a line D-D in FIG. 2. This aims to prevent the end piece M from rotating around the axial core of the temple T more effectively by increasing the adhesiveness between the temple T and the end piece M.

Figure 2:
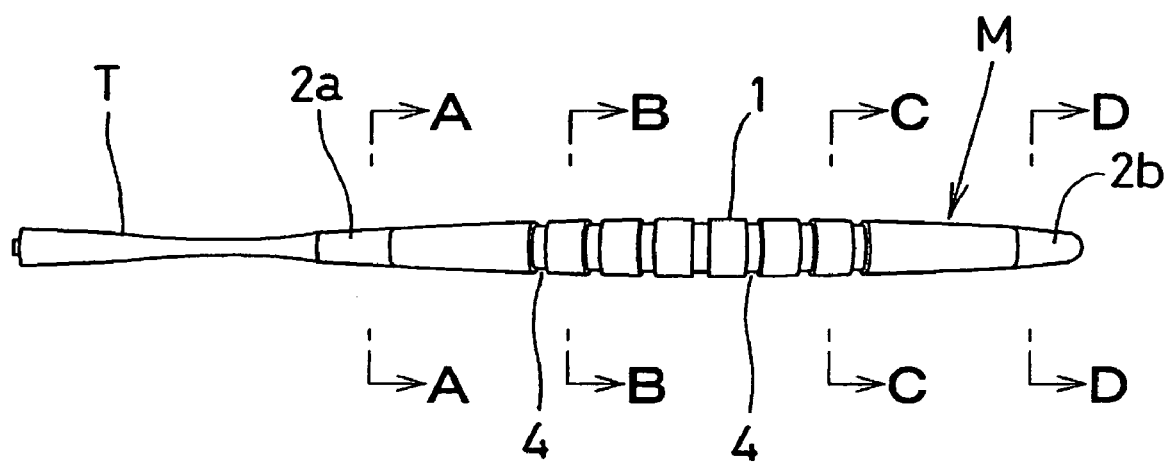
FIG. 2 is a side elevational view of a temple of an eyeglass to which the end piece of the present invention is attached.

Further, the surface of the flexible member 1 can be formed as a concave-convex (corrugated) surface, a satin finished surface or the like, thereby enlarging a friction coefficient so as to have a slip preventing effect from the temporal region and the ear root portion of the user. In this embodiment, the surface of the flexible member 1 is formed as a concave-convex surface by providing a plurality of grooves 4 at a fixed interval in a width direction of the flexible member 1 as shown in FIGS. 1 and 2.

In the eyewear end piece structured as mentioned above, the flexible member 1 serves as resistance to slip for preventing the end piece from slipping down, and the hard members 2a and 2b carry out a function of preventing the end piece from rotating around the axial core of the temple T and preventing the end piece form coming off the temple T. Accordingly, even in the case that the eyewear end piece M is applied to a sports sunglass used during hard exercises, the end piece M can maintain its comfortableness and the end piece M neither rotates around the axial core of the temple nor comes off from the temple.

What is claimed is:

1. An eyewear end piece comprising:
   a flexible member;
   a first hard member; and
   a second hard member; wherein
   the first hard member is formed on one end of a flexible member and the second hard member is formed on another end of the flexible member, respectively in an integral manner; and
   a hardness of the flexible member is at most 90 degree of JIS type A durometer hardness, and a hardness of the first hard member and the second hard member is at least 50 degree of JIS type D durometer hardness; and
   wherein said flexible member is at least three times the total combined length of the first and second hard members.

2. The eyewear end piece according to claim 1 further comprising an insertion hole for a temple, the insertion hole extending through the first hard member and the flexible member to the second bard member.

3. The eyewear end piece according to claim 1, wherein:
   a surface of the flexible member has high coefficient of friction.

4. The eyewear end piece according to claim 1, wherein:
   the flexible member is made of an elastomer resin.

5. The eyewear end piece according to claim 1 further comprising:
   an insertion hole for a temple, the insertion hole extending through the first hard member and the flexible member to the second hard member; wherein
   the first hard member is formed on one end of the flexible member and the second hard member is formed on another end of the flexible member, respectively in an integral manner; and
   each of a vertical cross sectional shape of the insertion hole at arbitrary positions in a front half and a rear half of the flexible member, a vertical cross sectional shape of the insertion hole at an arbitrary position of the first hard member, and a vertical cross sectional shape of the insertion hole at an arbitrary position of the second hard member are respectively formed in a rectangular shape, and a vertical cross sectional shape of the temple at corresponding positions is formed in a rectangular shape which coincides with the cross sectional shape of the insertion hole.

6. An eyewear end piece comprising:
   a flexible member;
   a first hard member;
   a second hard member;
   an insertion hole for a temple, which the insertion hole extends through the first hard member and the flexible member to the second hard member; and
   a come-off preventing means which is provided on an inner surface of the insertion hole; wherein
   the first hard member is formed on one end of the flexible member and the second hard member is formed on another end of the flexible member, respectively in an integral manner; and
   said come-off prevention means comprises at least one saw toot shaped notch formed on an inner surface of the insertion hole in said first hard member.

7. The eyewear end piece according to claim 6 further comprising an insertion hole for a temple, the insertion hole extending through the first hard member and the flexible member to the second hard member.

8. An eyewear end piece comprising:
   a flexible member;
   a first hard member;
   a second hard member;
   an insertion hole for a temple, which the insertion hole extends through the first hard member and the flexible member to the second hard member; and
   a come-off preventing means which is provided in an outer surface of the temple; wherein
   the first hard member is formed on one end of the flexible member and the second hard member is formed on another end of the flexible member, respectively in an integral manner; and
   said come-off prevention means comprises at least one saw tooth shaped notch.

9. The eyewear end piece according to claim 8 further comprising an insertion hole for a temple, the insertion hole extending through the first hard member and the flexible member to the second hard member.

10. The eyewear end piece according to any one of claims 6 and 8, wherein a length of the flexible member is made longer than a total combined length of the firs hard member and die second hard member.

* * * * *